United States Patent [19]
Larkin

[11] Patent Number: 6,109,034
[45] Date of Patent: Aug. 29, 2000

[54] CONTINUOUSLY VARIABLE HYDROSTATIC TRANSMISSION RATIO CONTROLLER CAPABLE OF GENERATING AMPLIFIED STROKING FORCES

[75] Inventor: Robert Francis Larkin, Pittsfield, Mass.

[73] Assignee: General Dynamics Land Systems, Inc., Sterling Heights, Mich.

[21] Appl. No.: 09/056,670

[22] Filed: Apr. 8, 1998

Related U.S. Application Data

[60] Provisional application No. 60/044,323, Apr. 25, 1997.

[51] Int. Cl.⁷ ..................................... F16D 31/02
[52] U.S. Cl. .............................................. 60/492
[58] Field of Search ....................... 60/487, 492; 91/506

[56] References Cited

U.S. PATENT DOCUMENTS

| | | |
|---|---|---|
| 1,648,000 | 11/1927 | Lee . |
| 1,840,866 | 1/1932 | Rayburn et al. ............. 91/506 |
| 2,788,636 | 4/1957 | Badalini . |
| 2,832,198 | 4/1958 | Pichon . |
| 3,175,363 | 3/1965 | Molly . |
| 3,204,411 | 9/1965 | Stockton . |
| 3,291,068 | 12/1966 | Wiggerman . |
| 3,313,108 | 4/1967 | Allgaier et al. . |
| 3,364,680 | 1/1968 | Ososnak . |
| 3,406,608 | 10/1968 | Diedrich ..................... 91/506 |
| 3,522,704 | 8/1970 | Martin . |
| 3,602,105 | 8/1971 | Slusher . |
| 3,654,761 | 4/1972 | Eickmann . |
| 3,740,954 | 6/1973 | Young . |
| 3,834,164 | 9/1974 | Ritter . |
| 4,355,506 | 10/1982 | Leonard ..................... 60/492 |
| 4,493,189 | 1/1985 | Slater . |
| 4,495,768 | 1/1985 | Valavaara . |
| 4,815,327 | 3/1989 | Drevet . |
| 4,896,585 | 1/1990 | Forster . |
| 4,901,529 | 2/1990 | Iino . |
| 5,269,142 | 12/1993 | Atake . |
| 5,423,183 | 6/1995 | Folsom . |
| 5,486,142 | 1/1996 | Folsom . |
| 5,493,862 | 2/1996 | Folsum ..................... 60/492 |
| 5,524,437 | 6/1996 | Larkin et al. . |
| 5,531,072 | 7/1996 | Larkin et al. . |
| 5,535,589 | 7/1996 | Folsom . |
| 5,678,405 | 10/1997 | Folsom . |

FOREIGN PATENT DOCUMENTS

| | | |
|---|---|---|
| 0 467 440 | 1/1992 | European Pat. Off. . |
| WO 92/12357 | 7/1992 | WIPO . |
| WO 96/31715 | 10/1996 | WIPO . |

*Primary Examiner*—F. Daniel Lopez
*Attorney, Agent, or Firm*—Finnegan, Henderson, Farabow, Garrett & Dunner

[57] ABSTRACT

To control transmission ratio of a continuously variable hydrostatic transmission including an input shaft, an output shaft, a hydraulic pump unit driven by the input shaft, a grounded hydraulic motor unit, and a wedge-shaped swashplate drivingly, pivotally connected to the output shaft and positioned to accommodate pumped hydraulic fluid exchanges between the pump and motor units. A ratio controller is provided having a pair of hydraulically actuated, differentially sized pistons coupled by a linkage mechanism to pivot the swashplate in opposite transmission ratio-changing directions. The smaller piston is incorporated internally of the output shaft, while the larger piston, of an annular shape, coaxially surrounds the output shaft. The linkage mechanism has geometry effective to translate axial forces exerted by the pistons into amplified ratio-changing moments exerted on the swashplate. The ratio controller also includes a control valve selectively positioned to change the hydraulic fluid pressure acting on the larger piston, such as to set a transmission ratio and also to determine the ratio-changing direction of swashplate pivotal motion.

16 Claims, 2 Drawing Sheets

CONTINUOUSLY VARIABLE HYDROSTATIC TRANSMISSION RATIO CONTROLLER CAPABLE OF GENERATING AMPLIFIED STROKING FORCES

This application claims benefit of provisional application Ser. No. 60/044,323 filed Apr. 25, 1997.

REFERENCE TO RELATED PATENTS

The present invention relates to an improved ratio controller having particular application in continuously variable transmissions of the type disclosed in U.S. Pat. Nos. 5,423,183; 5,486,142; 5,524,437; 5,535,589; and 5,678,405. The disclosures of these patents are incorporated herein by reference.

FIELD OF THE INVENTION

The present invention relates to hydraulic machines, and more particularly, to hydrostatic transmissions capable of transmitting power from a prime mover to a load at continuously (infinitely) variable transmission ratios.

BACKGROUND OF THE INVENTION

In the cited patents, a hydrostatic transmission is disclosed as including a hydraulic pump unit and a hydraulic motor unit positioned in opposed, axially aligned relation on opposite sides of a wedge-shaped swashplate. The pump unit is connected to an input shaft driven by a prime mover, while the motor unit is ground to the stationary transmission housing. An output shaft, coaxial with the input shaft and drivingly coupled to a load, is connected to the swashplate in torque-coupled relation. When the pump unit is driven by the prime mover, hydraulic fluid is pumped back and forth between the pump and motor unit through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a purely hydrostatic component resulting from the differential forces created by the hydraulic pressures acting on circumferentially opposed end surfaces of the swashplate ports, which are of different surface areas due to the wedge shape of the swashplate.

The torque-coupled connection of the wedge-shaped swashplate to the output shaft is such that the angular orientation of the swashplate relative to the axis of the output shaft may be varied. When the input face of the swashplate, juxtaposed with the pump unit, is perpendicular to the output shaft axis, the transmission ratio, i.e., speed ratio, is set to 0:1 (neutral). On the other hand, when the output face of the swashplate, to juxtaposed with the motor unit and angularly offset from the input face, is perpendicular to the output shaft axis, the transmission is set to 1:1. Since the swashplate may be pivoted (stroked) to any angular orientation between the 1:0 and 1:1 ratio positions to set any intermediate ratio, the speed ratio of the transmission is continuously (infinitely) variable.

In the hydrostatic transmissions disclosed in the referenced patents, various embodiments of controllers are disclosed for stroking a wedge-shaped swashplate to vary transmission ratio. These ratio controller embodiments utilize either a single, double-acting piston or a pair of opposed pistons driven in opposite axial directions by pressurized hydraulic fluid tapped from the swashplate ports for exerting stroking forces (moments) on the swashplate to vary the swashplate angular orientation and thus to increase (up-stroke) or decrease (down-stroke) transmission ratio. The stroking force exerted by these actuating pistons is solely the product of hydraulic fluid pressure and the area of the piston face exposed to the hydraulic fluid pressure. Unfortunately, the force(s) generated by the piston(s) to set a transmission ratio and the stroking force necessary to change transmission ratio vary according to the angular orientation of the swashplate. For example, at approximately the 0.5:1 ratio position, when the angles of the input and output faces of the swashplate relative to the output shaft axis are equal, the opposing forces of the pump hydraulic fluid acting on the swashplate faces are essentially equal. Thus the requisite force(s) exerted on the swashplate by the activating piston(s) to set the 0.5:1 ratio position of the swashplate is minimal. However, the forces generated by the activating piston(s) to up-stroke or down-stroke the swashplate from the 0.5:1 ratio position must increase disproportionately to the increase in hydraulic fluid pressure available from the swashplate ports. Consequently, the actuating piston(s) must have sufficiently large face surface areas in order to generate requisite forces to both vary and set transmission ratios over the available range of ratios, which may include a reverse range beyond the 0:1 ratio position and a limited overdrive range beyond the 1:1 ratio position. A large actuating piston(s) adds size and weight to the transmission.

Another characteristic of the ratio controllers disclosed in the referenced patents is that the swashplate is mounted on a transverse pivot pin fixed to the output shaft to establish a swashplate pivot axis intersecting the output shaft axis at a right angle. Axially directed stroking forces are then exerted on the swashplate at locations radially offset from the output shaft axis to generate moments necessary to vary and set transmission ratios. Unfortunately, these moments exert bending forces on the output shaft, which place high loadings on bearings and support structure and can cause output shaft deflection. Consequently, the output shaft and its supporting components must be sized accordingly to withstand such bending moments. This further adds to the size and weight, as well as cost, of the transmission.

SUMMARY OF THE INVENTION

An objective of the present invention is to provide an improved continuously variable hydrostatic transmission.

Another objective of the present invention is to provide improvements in the provisions for controlling transmission ratio in continuously variable hydrostatic to transmissions.

A further objective of the present invention is to provide an improved ratio controller for continuously variable hydrostatic transmissions of the type disclosed in the cited U.S. patents.

Yet another objective is to provide an improved ratio controller for continuously variable hydrostatic transmissions that affords packaging advantages contributing to reductions in transmission size, weight and cost.

To achieve these objectives, the continuously variable hydrostatic transmission of the present invention comprises a housing; an input shaft journalled in the housing; an output shaft journalled in the housing and having an axis; a hydraulic pump unit driven by the input shaft; a hydraulic motor unit fixed to the housing; a wedge-shaped swashplate positioned between the hydraulic pump and motor units and including ports to accommodate pumped flow of hydraulic fluid between the hydraulic pump and motor units; and a connector pivotally connecting the swashplate to the output shaft in torque-coupled relation.

The transmission further comprises a ratio controller including a first chamber coupled to received pressurized hydraulic fluid, a first piston having a first face surface area exposed to the pressurized hydraulic fluid in the first chamber, a second chamber coupled to received pressurized fluid, a second piston having a second face surface area exposed to the pressurized hydraulic fluid in the second chamber, the second face surface area being greater than the first face surface area, and a linkage mechanism connected to the swashplate and acted upon by the first piston driven in a first direction by the pressurized hydraulic fluid in the first chamber to produce a first moment pivoting the swashplate in a first transmission ratio-changing direction and acted upon by the second piston driven in a second direction opposite the first direction by the pressurized hydraulic fluid in the second chamber to produce a second moment pivoting the swashplate in a second transmission ratio-changing direction.

In accordance with a feature of the present invention, the linkage mechanism has a geometry effective to translate axially forces exerted on the linkage mechanism by the first and second pistons, when driven in their respective first and second directions, into amplified first and second moments for pivoting the swashplate in the first and second transmission ratio-changing directions, respectively.

Additional features and advantages of the invention will be set forth in the description which follows, and, in part, will be apparent from the description, or may be learned from practice of the invention. The objectives and advantages of the invention will be realized and attained by the apparatus particularly pointed out in the following written description and the appended claims, as well as the accompanying drawings.

It will be understood that both the foregoing general description and the following detailed description are exemplary and explanatory and are intended to provide further explanation of the invention as claimed.

The accompanying drawings are intended to provide a further understanding of the invention, and are incorporated in and constitute a part of the specification to illustrate an embodiment of the invention, and, together with the description, serve to explain the principles of the invention.

BRIEF DESCRIPTION OF THE DRAWINGS

In the drawings.

Like reference numerals refer to corresponding parts throughout the several views of the drawings.

DETAILED DESCRIPTION OF THE PREFERRED EMBODIMENT

Figure 1:
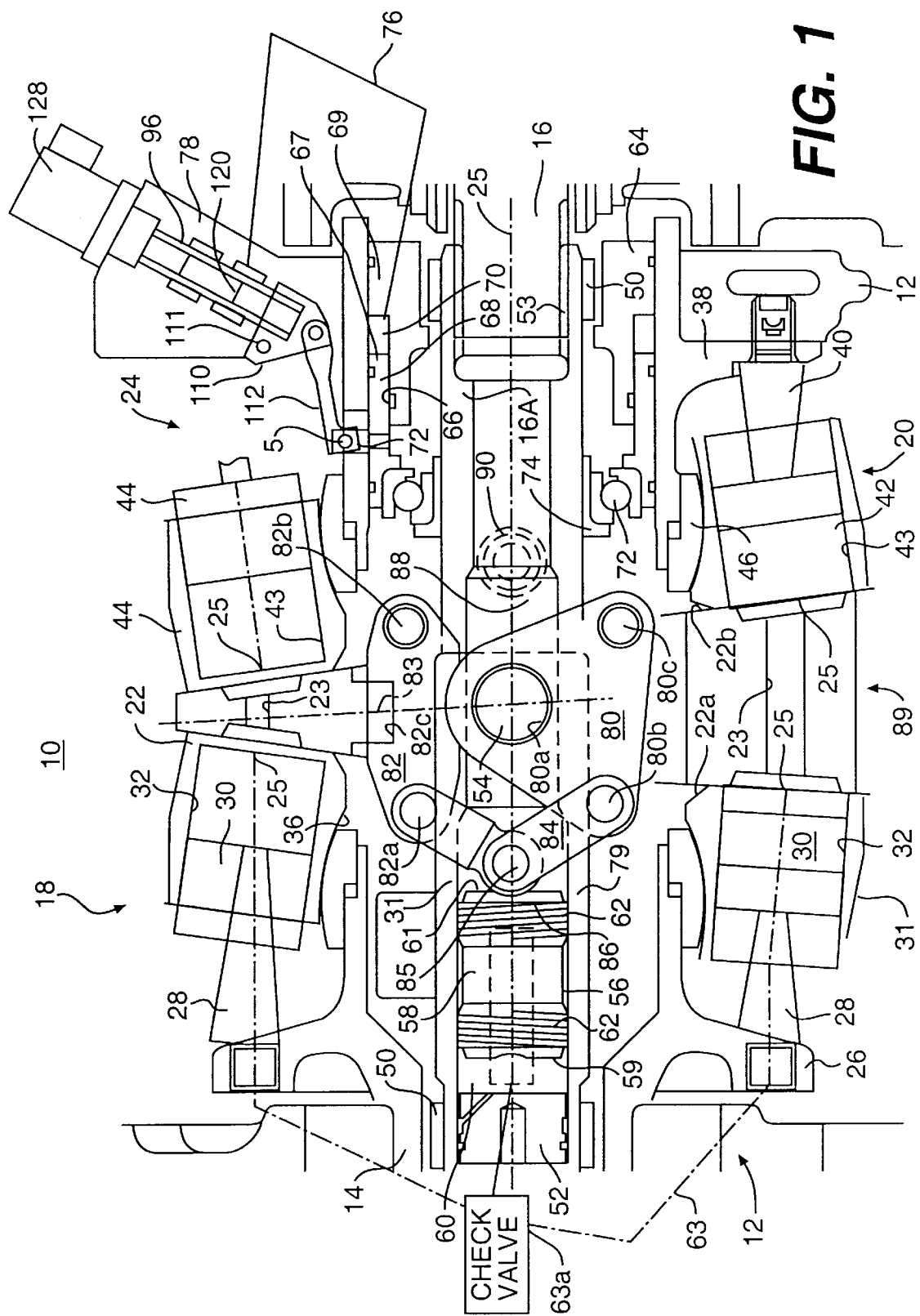
FIG. 1 is a fragmentary longitudinal sectional view of a continuously variable hydrostatic transmission incorporating an improved ratio controller in accordance with an embodiment of the present invention.

As seen in FIG. 1, a continuously variable hydrostatic transmission, generally indicated at 10, comprises, as basic components, a housing, fragmentarily indicated at 12, in which are journalled an input shaft 14 and an output shaft 16 in coaxial, generally end-to-end relation. The end of input shaft external to the housing is suitably adapted for driving connection to a prime mover (not shown), while the end of output shaft external to the housing is suitably adapted for driving connection to a load (not shown). Input shaft 14 drives a hydraulic pump unit, generally indicated at 18. A hydraulic motor unit, generally indicated at 20, is grounded to housing 12 in axially opposed relation to pump unit 18. A wedge-shaped swashplate, generally indicated at 22, is drivingly connected to the output shaft in a position between the pump and motor units and is ported to provide for pumped exchanges of hydraulic fluid between the pump and motor units. A ratio controller, generally indicated at 24 and structured in accordance with an embodiment of the present invention, is linked to the swashplate for the purpose of pivotally adjusting swashplate angular orientation relative to the output shaft axis 25, thereby setting the transmission ratio of output shaft speed to input shaft speed.

Now referring to FIG. 1 in greater detail, the inner, cylindrical end of input shaft 14 is joined with radially extended carrier 26 that mounts a plurality of axially outstanding, angularly spaced posts 28, each swivel-mounting a pump piston 30 respectively reciprocating in a separate cylinder 32 of an annular pump cylinder block 34. A cylindrical extension of the piston carrier 26 mounts an annular spherical bearing 36 serving to mount pump cylinder block 34 for precessing motion as the pump unit 18 is driven in rotation by input shaft 14.

Hydraulic motor unit 20 is essentially equivalent to hydraulic pump unit 18.

However, an annular motor piston carrier 38, equivalent to rotating pump piston carrier 26, is instead grounded to housing 12 by an annular array of posts 40, which also serve to swivel-mount at their free ends motor pistons 42. These motor pistons reciprocate and in respective cylinders 43 provided in a motor cylinder block 44, which is swivel-mounted on the motor piston carrier via an annular spherical bearing 46. Since motor unit 20 is grounded to housing 12, motor pistons 42 and motor cylinder block 44 do not rotate. However, the spherical mountings of the motor pistons to posts 40 and the motor cylinder block to carrier 38 accommodate nutating, precessing motion of the motor cylinder block in the same manner as the pump cylinder block.

Reference may be had to the above-cited patents for a more detailed description of hydraulic pump unit 18 and hydraulic motor unit 20. As also described in these patents, opposed faces of the pump and motor cylinder blocks are pressed into sliding interfacial contact with input 22a and output 22b faces of swashplate 22. The input and output faces of swashplate 22 are angularly oriented at an acute angle to provide the wedge swashplate shape. Ports 23, extending between the input and output faces of the swashplate, communicate with openings 25 in the pump and motor cylinders, such that hydraulic fluid is pumped back and forth between the pump and motor units to generate hydrostatic output torque in the swashplate.

Still referring to FIG. 1, the portion of output shaft 16 extending through the central openings in pump 18 and motor 20 hydraulic units and swashplate 22 is formed as a hollow cylindrical section 16A. Roller bearings 50 serve to journal the output shaft section 16A for rotation in coaxial relation within input shaft 14. The open interior of output shaft section 16A is closed off at its inner termination by a plug 52 and is splined, as indicated at 53, at its outer end for driving connection with the inner end of solid output shaft 16. A pivot pin 54 extends transversely through output shaft section 16 and serves to mount swashplate 22 for ratio-changing pivotal motion about a pivot axis that intersects output shaft axis 25 at a right angle. The axial bore of output shaft section 16A adjacent its inner termination provides a cylinder 56 for slidingly receiving an actuating piston 58 to the left side of pivot pin 54. The left end face 59 of actuating piston 58, cylinder 56, and plug 52 define a chamber 60 that is coupled only into the high pressure side of swashplate via a hydraulic fluid circuit diagrammatically indicated at 63. Examples of how such a fluid circuit may be established to tap pressurized hydraulic fluid from the high pressure side of swashplate 22 are disclosed in reference U.S. Pat. Nos. 5,423,183 and 5,535,589. While hydraulic circuit 150 in U.S. Pat. No. 5,535,589 is structured to couple only into the low pressure side of the swashplate, to couple only into the high pressure side of the swashplate, pursuant to the present invention, merely involves reversing the flow direction of check valve 154 in the U.S. Pat. No. 5,535,589. Fluid circuit 63 herein includes such a check valve, as indicated at 63a.

As indicated at 62, piston rings are provided to prevent hydraulic fluid leakage from chamber 60 past actuating piston 58.

To the output (right) side of pivot pin 54, a sleeve 64 of L-shaped cross section is fitted within the central opening of stationary motor piston carrier 38 to provide an annular cylinder 66 for slidingly receiving an annular actuating piston 68. An annular chamber 70 is thus defined between the right end face 67 of piston 68 and a radial wall 69 of sleeve 64 closing off the right end of cylinder 66. In accordance with a feature of the present invention, the area of the right end face 67 of actuating piston 68 is greater than the area of the left end face 59 of actuating piston 58.

The left end of actuating piston 68 is notched to accept the outer ring of a thrust-bearing 72, whose inner ring is received in a complementing notch provided in a collar 74 slidingly mounted on output shaft section 16A. Annular chamber 70 is fluidically coupled by a fluid circuit, diagrammatically indicated at 76, to a control valve, generally indicated at 78 and disclosed in greater detail in FIG. 2.

As further seen in FIG. 1, a triangular crank arm 80 is provided at an upper vertex with a hole 80a through which pivot pin 54 is received in close-fitting relation, such as to pivotally mount the crank arm at a central location within output shaft section 16A generally aligned with output shaft axis 25. The crank arm depends through an axially elongated slot 79 in output shaft section 16A and serves to mount a pin 80b at a second vertex to the left of pivot pin 54 and a pin 80c at a third vertex to the right of the pivot pin. An axially elongated drive arm 82, located in diametrically opposed relation to crank arm 80, carries a pin 82a at its left end and a pin 82b at its right end. The upper edge of drive arm 82 is formed with a notch 82c for receiving a radially inwardly extending tongue 83 formed on the swashplate 22, thereby connecting the drive arm to the swashplate. Drive arm 82 is received through an axially elongated slot 81 in output shaft section 16A and has a lower edge curved in conformance with the rounded upper vertex of crank arm 80, on which the drive arm is supported. A pair of links 84 are pivotally interconnected by pin 85 to provide a knuckle 86, while their free ends are apertured to respectively receive pin 82a carried by drive arm 82 and pin 80b carried by crank arm 80. A second pair of arcuate links 88 are interconnected by a pin 89 to provide a knuckle 90, and their free ends are apertured to respectively receive drive arm pin 82b and crank arm pin 80c. The arcuate shape of links 88 allows them to extend along the periphery of output shaft section 16A in closely spaced relation. As seen in FIG. 1, knuckle 86 of links 84 is positioned to engage the right face 61 of actuating piston 58, and knuckle 90 of links 88 is positioned to engage the left edge of collar 74 that is connected to actuating piston 68 by thrust washer 72.

As will be seen from the description to follow, the geometry of the pivotably interconnected crank arm 80, drive arm 82, and link pairs 84 and 88 provides a mechanism capable of translating axial forces produced by actuating pistons 68 and 58 into amplified moments exerted on swashplate 22 of sufficient force to stroke swashplate 22 to infinitely variable transmission ratio angular positions regardless of swashplate orientation.

Figure 2:
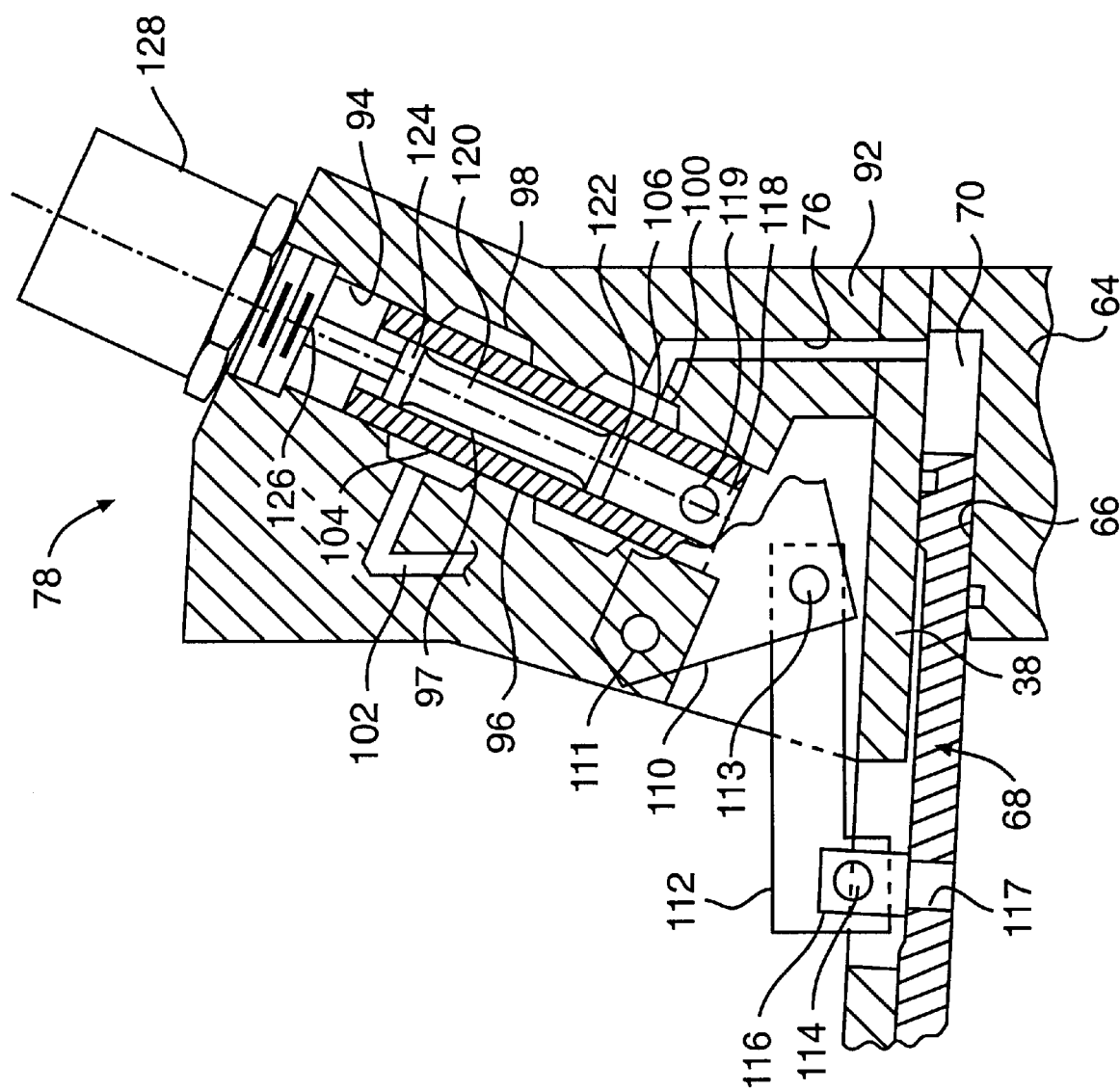
FIG. 2 is an enlarged, fragmentary sectional view of a control valve utilized in the improved ratio controller of FIG. 1.

Turning to the enlargement of FIG. 2, control valve 78 includes a valve body 92 affixed to transmission housing 12 and having a bore 94 for slidingly receiving a valve sleeve 96. An upper annular cavity 98 and a lower annular cavity 100 are machined into the surface of bore 94. The outer termination of a fluidic circuit 102 is in fluid communication with cavity 98 to supply this cavity with hydraulic fluid tapped from the high pressure side of swashplate 22. An example of how such a fluidic circuit may be provided is disclosed in cited U.S. Pat. No. 5,486,142. Cavity 100 is coupled into actuating chamber 70 by fluidic circuit 76 provided by a passage formed in valve body 92 and motor piston carrier 38. A port 104, drilled through the wall of valve sleeve 96, provides fluid communication between annular cavity 98 and the valve sleeve interior 97. A port 106 is also drilled through the wall of valve sleeve 96 to provide fluidic communication between the valve sleeve interior and annular cavity 100 in the valve body bore 94.

A crank 110 is pivotally mounted at its upper end to valve body 92 by a pin 111. A link 112 is pivotally connected to a lower end of crank 110 by a pin 113, while the free end of this link carries a pin 114 for pivotally mounting the upper end of a peg 116. The lower end of this peg is captured in a hole 117 drilled in actuating piston 68. Crank 110 also includes a bifurcated projection that provides a slot 118 for receiving a transverse pin 119 carried at the lower end of sleeve 96. As seen from this description, actuating piston 68 is linked to valve sleeve 96, such that movement and position of this actuating piston is effective to move and position the valve sleeve within valve bore 94. Concluding the structural description of valve 78, slidingly mounted within valve sleeve 96 is a valve spool 120 having a cylindrical land 122 at its lower end, and a cylindrical land 124 at its upper end. Land 122 serves to open and close port 106 in valve sleeve 96, while land 124 merely serves as a bearing surface to ensure smooth and sliding movement of valve spool 120 coaxially within valve sleeve 96. To vary the axial position of valve spool 120 within valve sleeve 96, the upper end of the valve spool is connected to a lead screw 126, which is driven by a stepper motor 128 mounted at the upper end of valve body 92.

From the description of control valve 78, it is seen that when valve spool 120 is advanced downwardly through valve sleeve 96, land 122 opens port 106 into fluid communication with port 104, such that high pressure hydraulic fluid existing in annular cavity 98 may flow into cavity 100 and through fluidic circuit 76 to pressurize actuating chamber 70. On the other hand, when valve spool 120 is drawn upwardly by stepper motor 128, land 122 opens port 106 to vent actuating chamber 70 to atmospheric pressure existing in the lower end of valve sleeve 96 below land 122.

As previously noted, actuating chamber 60 in FIG. 1 is continuously pressurized via fluidic circuit 62 to the hydraulic fluid pressure existing in the high pressure side of swashplate 22. Thus, when actuating chamber 70 is vented to atmospheric pressure by valve 78, the high fluid pressure in chamber 60 exerts sufficient force on face 59 of actuating piston 58 to drive this piston rightward. Face 61 of actuating piston 58 drivingly engages knuckle 86, causing links 84 to straighten. A generally upward force is thus exerted on pin 82*a*, and a generally downward force is exerted on pin 82*b*. Crank arm 80 freely pivots on pivot pin 54 in the counterclockwise direction, while drive arm 82 is rocked in the clockwise direction, causing swashplate 22 to be pivoted in the clockwise direction to increase transmission ratio. At the same time, a generally upward force is exerted on pivot pin 80*c* as crank arm 80 pivots in the counterclockwise direction, and a generally downward force is exerted on pin 82*c* as drive arm 82 is rocked in the clockwise direction. Links 88 are thus caused to collapse, producing a rightward force on knuckle 90, which, in turn, drives actuating piston 68 in the rightward direction via collar 74 and thrust bearing 72. Since chamber 70 is vented to atmospheric pressure, actuating piston 68 offers little resistance to the axial driving force of actuating piston 58 in stroking swashplate 22 in the clockwise direction to increase transmission ratio.

To decrease transmission ratio, valve spool 120 is moved downwardly by stepping motor 128 to open port 106, such that actuating chamber 70 is pressurized to the hydraulic fluid pressure existing in the high pressure side of the swashplate via fluidic circuit 102, cavity 98, and port 104. Although actuating chambers 60 and 70 are now pressurized to the same high fluid pressure, the leftward force exerted on actuating piston 68 is greater than the rightward force exerted on actuating piston 58, since the face 67 of actuating piston 68 is of a greater area than the area of face 59 of actuating piston 58. Thus, the axial force exerted on knuckle 90 of links 88 by actuating piston 68 is greater than the rightward force exerted on knuckle 86 of links 84 exerted by actuating piston 58. As knuckle 90 is driven leftward, links 88 are straightened to exert a generally upward force on pin 82*b* and a downward force on pin 80*c*. Crank arm 80 is rotated in the clockwise direction to exert a generally upward force on pin 80*b*, while the generally upward force exerted on pin 82*b* rocks drive arm 82 in the counterclockwise direction to exert a downward force on pin 82*a*. Links 84 collapse, driving knuckle 86 in the leftward direction, which, in turn, drives piston 58 leftward as swashplate 22 is stroked in the counterclockwise direction to decrease transmission ratio.

By virtue of the geometrical relationships of the pivotal interconnections of links 84 and 88 to each other and to drive arm 82 and crank arm 80, the axial forces generated by actuating pistons 58 and 68 on knuckles 86 and 90 will produce vertical forces on the drive arm and crank equal to the tangent of the angles of the links to the axis 25 of the output shaft. Thus, for example, if the angles of links 88 to axis 25 are equal to 75°, as approximately shown in FIG. 1, the vertical forces exerted on pins 82*b* and 80*c* as links 88 are straightened are equal to the tangent of a 75° angle times the leftward axial force exerted on knuckle 90 by actuating piston 68. Thus, the axial forces exerted by actuating piston 68 are translated into vertical forces on pins 80*c* and 82*b* that are amplified by a factor of 3.732. This force amplification factor increases as the angle of the links 88 to output shaft axis 25 approaches 90°. At the same time, the opposed, generally vertical forces translated to pins 80*b* and 82*a* by crank arm 80 and drive arm 82 cause links 84 to collapse. An axial force (which is amplified as long as the angle of these links to axis 25 is greater than 45°) at knuckle 86 drives actuating piston 86 leftward. By virtue of this force amplification feature of the present invention and the larger face surface area of actuating piston 68, the axial stroking force produced by this piston can be made sufficiently powerful to not only overpower actuating piston 58, but also generate an abundant down-stroking moment on swashplate 22 to decrease transmission ratio regardless of swashplate angular orientation. It will be appreciated that, under certain operating conditions, the force exerted by crank arm 80 tending to collapse links 84 can produce a generally downward force on pin 82*a* that supplements the down-stroking force exerted by drive arm 80 on swashplate 22.

As an additional feature of the present invention, the axial stroking forces generated by activating pistons 58 and 68 are translated into oppositely directed, generally vertical forces, which, although amplified in magnitude, cancel each other at knuckle pins 85 and 89. Thus, the stroking forces exerted on swashplate 22 do not result in bending moments exerted on the output shaft.

Returning to FIG. 2, the axial position of valve spool 120 within valve sleeve 96 set by a vehicle operator control via stepping motor 128 establishes a desired angular orientation (transmission ratio) of swashplate 22. Any particular transmission ratio is set when the elements of control valve 78 are in the position illustrated in FIG. 2. It is seen that land 122 blocks port 106, and thus the flow of hydraulic fluid into and out of actuating chamber 70 is blocked. The fluid pressure in actuating chamber 70 thus assumes a level sufficient to exert a force on actuating piston 68 that exactly balances the force exerted on actuating piston 58 by the hydraulic fluid pressure in actuating chamber 60. These balanced, oppositely directed forces produce balanced, opposing moments on swashplate 22 effective to sustain a desired ratio-setting angular orientation of swashplate 22. Since the surface area of piston face 67 is greater than the surface area of piston face 59, the fluid pressure in actuating chamber 70 necessary to hold a ratio setting will be less than the fluid pressure in actuating chamber 60.

When stepping motor 128 is activated to drive valve spool 120 downwardly in response to a vehicle operator command to decrease transmission ratio (reduce vehicle speed), port 106 is opened by land 122, such that the hydraulic fluid pressure in actuating chamber 70 can be increased to the level existing in the high pressure side of swashplate 22, i.e., equal to the fluid pressure in actuating chamber 60. By virtue of the larger face surface area of actuating piston 68, this piston is driven leftward to down-stroke swashplate 22. By virtue of the feedback path provided by link 112 and crank 110, leftward movement of actuating piston 68 is translated into downward movement of valve sleeve 96. When the swashplate is down-stroked to the ratio-setting position commanded by the depressed position of valve spool 120, valve sleeve 96 is drawn downward such that port 106 is completely blocked by land 122. Actuating chamber 70 is then isolated from port 104 and the high pressure side of swashplate 22, leaving the fluid pressure in chamber 70 at a level sufficient to exert a leftward axial force on actuating piston 68 to counterbalance the rightward axial force exerted on actuating piston 58 by the fluid pressure in actuating chamber 60. The downstroked ratio setting of swashplate commanded by the operator is thus sustained.

Conversely, when the operator commands an increased speed, stepping motor 128 draws valve spool 120 upwardly toward an elevated position. Land 122 again unblocks port 106, but, in this case, actuating chamber 70 is vented to atmospheric pressure through the open lower end of valve sleeve 96. Actuating piston 58 is then empowered by the high fluid pressure in actuating chamber 60 to up-stroke swashplate 22 and drive actuating piston 68 rightward. Valve sleeve 96 is thus driven upwardly via the feedback motions of link 112 and crank 110 until land 122 again completely blocks port 106 to isolate actuating chamber 70. The axial forces of actuating pistons 58 and 68 are again counterbalanced to sustain the new higher ratio position of swashplate commanded by the operator.

From the foregoing description, it is seen that valve spool 120 is positioned in response to operator ratio-setting commands and movement of valve sleeve 96 tracks the movement of swashplate 22 via the feedback mechanism afforded by actuating piston 68, link 112, and crank 110 to indicate when the operator ratio-setting commands have been satisfied. It will also be noted that the fluid pressure in only one chamber, actuating chamber 70, is controlled in order to up-stroke and down-stroke swashplate 22, as well as to sustain a ratio setting of the swashplate. Since actuating chamber 60 is continuously fluid coupled to the high pressure side of swashplate 22 and, along with actuating piston 58, is contained with output shaft section 16A, high PV (pressure/velocity) fluid sealing considerations imposed by fluidic circuit 62 are relaxed. Since actuating chamber 70 is located at the hydraulic motor unit side of the transmission where the components are stationary, fluid sealing for fluidic circuits 76 and 102, in the manner discussed in commonly assigned, copending application Ser. No. 089/608,389, filed Feb. 28,1996, is of little concern.

It will be appreciated that valve spool positioning by stepping motor 128 may be controlled by electronic digital processing circuitry responsive to operator inputs and various operating parameters of transmission 10, such as hydraulic fluid pressure, input shaft speed, and output shaft speed. Each revolution or partial revolution (step) of stepping motor 128 will cause a finite movement of valve spool 96, which, in turn, produces a finite increment of swashplate stroke. Thus, swashplate ratio-settings can be achieved with extreme precision. When the stepping motor is not stepped, valve spool 120 is stationary, as is the ratio-setting angular position of swashplate 22.

It will be apparent to those skilled in the art that various modifications and variations can be made in the continuously variable hydrostatic transmission of the present invention and in the illustrated construction thereof without departing from the scope or spirit of the invention. Other embodiments of the invention will be apparent to those skilled in the art from consideration of the specification and practice of the to invention disclosed herein. For example, both actuating pistons 58 and 68 could be provided internally of output shaft section 16A or provided as annular components coaxially surrounding the output shaft section. It is therefore intended that the specification and drawings be considered as exemplary only, with the true scope and spirit of the invention being indicated by the following claims.

What is claimed is:

1. A continuously variable hydrostatic transmission comprising, in combination:
    a housing;
    an input shaft journalled in the housing;
    an output shaft journalled in the housing and having an axis;
    a hydraulic pump unit driven by the input shaft;
    a hydraulic motor unit fixed to the housing;
    a wedge-shaped swashplate positioned between the hydraulic pump and motor units and including ports to accommodate pumped flow of hydraulic fluid between the hydraulic pump and motor units;
    a connector pivotally connecting the swashplate to the output shaft in torque-coupled relation; and
    a ratio controller including:
        a first chamber coupled to received pressurized hydraulic fluid,
        a first piston having a first face surface area exposed to the pressurized hydraulic fluid in the first chamber,
        a second chamber coupled to receive pressurized hydraulic fluid,
        a second piston having a second face surface area exposed to the pressurized hydraulic fluid in the second chamber, the second face surface area being greater than the first face surface area, and
        a linkage mechanism connected to the swashplate and acted upon by the first piston driven in a first direction by the pressurized hydraulic fluid in the first chamber to produce a first moment pivoting the swashplate in a first transmission ratio-changing direction and acted upon by the second piston driven in a second direction opposite the first direction by the pressurized hydraulic fluid in the second chamber to produce a second moment pivoting the swashplate in a second transmission ratio-changing direction,
    wherein the first chamber and first piston are provided internally of the output shaft, and the second chamber and second piston are provided as annular components coaxially surrounding the output shaft.

2. The transmission defined in claim 1, wherein the first chamber is exclusively fluidically coupled to a high hydraulic fluid pressure side of the swashplate, and wherein the ratio controller further includes a control valve acting to selectively control hydraulic fluid pressure in the second chamber.

3. The transmission defined in claim 2, wherein the control valve is selectively positioned to 1) close the second chamber such as to inhibit driven movements of the first and second pistons in their respective first and second directions, thereby to maintain a transmission ratio-setting angular position of the swashplate, 2) vent the second chamber, thereby to permit driven movement of the first piston in the first direction to pivot the swashplate in the first transmission ratio-changing direction, and 3) couple the second chamber to the high hydraulic fluid pressure side of the swashplate, thereby to produce driven movement of the second piston in the second direction to pivot the swashplate in the second transmission ratio-changing direction.

4. The transmission defined in claim 3, wherein the control valve includes:
    a valve body having an elongated bore and first and second axially elongated cavities formed in a surface of the bore at axially displaced locations, a first passage coupling the first cavity to the high hydraulic fluid pressure side of the swashplate, and a second passage coupling the second cavity to the second chamber;
    an elongated valve sleeve disposed in the bore and having a first radial port open to the first cavity and a second radial port open to the second cavity; and
    a valve spool slidingly received in the valve sleeve and having a land for opening and closing the second port.

5. The transmission defined in claim 4, wherein the ratio controller further includes an actuator connected to adjust an axial position of the valve spool within the valve sleeve according to an operator-selected transmission ratio setting.

6. The transmission defined in claim 5, wherein the ratio controller further includes a feedback linkage interconnecting the second piston and the valve sleeve for axially positioning the valve sleeve within the valve body in accordance with an angular, transmission ratio-setting position of the swashplate.

7. The transmission defined in claim 6, wherein the valve sleeve includes a vent opening to which the second port is placed into fluid communication by the valve spool when axially positioned by the actuator to produce pivotal motion of the swashplate in the first ratio-changing direction.

8. A continuously variable hydrostatic transmission comprising, in combination:

a housing;

an input shaft journalled in the housing;

an output shaft journalled in the housing and having an axis;

a hydraulic pump unit driven by the input shaft;

a hydraulic motor unit fixed to the housing;

a wedge-shaped swashplate positioned between the hydraulic pump and motor units and including ports to accommodate pumped flow of hydraulic fluid between the hydraulic pump and motor units;

a connector pivotally connecting the swashplate to the output shaft in torque-coupled relation; and a ratio controller including:

a first chamber coupled to received pressurized hydraulic fluid, a first piston having a first face surface area exposed to the pressurized hydraulic fluid in the first chamber, a second chamber coupled to receive pressurized hydraulic fluid, a second piston having a second face surface area exposed to the pressurized hydraulic fluid in the second chamber, the second face surface area being greater than the first face surface area, and a linkage mechanism connected to the swashplate and acted upon by the first piston driven in a first direction by the pressurized hydraulic fluid in the first chamber to produce a first moment pivoting the swashplate in a first transmission ratio-changing direction and acted upon by the second piston driven in a second direction opposite the first direction by the pressurized hydraulic fluid in the second chamber to produce a second moment pivoting the swashplate in a second transmission ratio-changing direction, wherein the linkage mechanism has a geometry effective to translate axially forces exerted on the linkage mechanism by the first and second pistons, when driven in their respective first and second directions, into amplified first and second moments for pivoting the swashplate in the first and second transmission ratio-changing directions, respectively wherein the linkage mechanism including an axially elongated drive arm, a crank arm, a pair of first elongated links connected to the drive arm and the crank arm, and a pair of second elongated links connected to the drive arm and the crank arm.

9. The transmission defined in claim 8, wherein the connector includes a transverse pivot pin fixed to the output shaft and having a pivot axis intersecting the axis of the output shaft, and wherein the linkage mechanism includes:

the axially elongated drive arm having a connection to the swashplate at a location radially displaced from the pivot axis and first and second connection points displaced in respective opposite axial directions from the pivot axis, the crank arm pivotally mounted by the pivot pin in substantially diametrically opposed relation to the drive arm and having first and second connection points displaced in respective opposite axial directions from the pivot axis, the pair of first elongated links pivotally interconnected at corresponding one ends to produce a first knuckle and having free ends respectively pivotally connected to the first connection points of the drive arm and crank arm, and the pair of second elongated links pivotally interconnected at corresponding one ends to produce a second knuckle and having free ends respectively pivotally connected to the second connection points of the drive arm and crank arm, whereby the axial force exerted on the first knuckle by the first piston, when driven in the first axial direction, straightens the first links and collapses the second links to drive the second piston in the first axial direction and to exert the amplified first moment on the swashplate, and the axial force exerted on the second knuckle by the second piston, when driven in the second axial direction, straightens the second links and collapses the first links to drive the first piston in the second axial direction and to exert the amplified second moment on the swashplate.

10. The transmission defined in claim 9, wherein the first chamber and first piston are provided internally of the output shaft, and the second chamber and second piston are provided as annular components coaxially surrounding the output shaft.

11. The transmission defined in claim 10, wherein the first chamber is exclusively fluidically coupled to a high hydraulic fluid pressure side of the swashplate, and wherein the ratio controller further includes a control valve acting to selectively control hydraulic fluid pressure in the second chamber.

12. The transmission defined in claim 11, wherein the control valve is selectively positioned to 1) close the second chamber such as to inhibit driven movements of the first and second pistons in their respective first and second directions, thereby to maintain a transmission ratio-setting angular position of the swashplate, 2) vent the second chamber, thereby to permit driven movement of the first piston in the first direction to pivot the swashplate in the first transmission ratio-changing direction, and 3) couple the second chamber to the high hydraulic fluid pressure side of the swashplate, thereby to produce driven movement of the second piston in the second direction to pivot the swashplate in the second transmission ratio-changing direction.

13. The transmission defined in clam 12, wherein the control valve includes:

a valve body having an elongated bore and first and second axially elongated cavities formed in a surface of the bore at axially displaced locations, a first passage coupling the first cavity to the high hydraulic fluid pressure side of the swashplate, and a second passage coupling the second cavity to the second chamber;

an elongated valve sleeve disposed in the bore and having a first radial port open to the first cavity and a second radial port open to the second cavity; and a valve spool slidingly received in the valve sleeve and having a land for opening and closing the second port.

14. The transmission defined in clam 13, wherein the ratio controller further includes an actuator connected to adjust an axial position of the valve spool within the valve sleeve according to an operator-selected transmission ratio setting.

15. The transmission defined in claim 14, wherein the ratio controller further includes a feedback linkage interconnecting the second piston and the valve sleeve for axially positioning the valve sleeve within the valve body in accordance with an angular, transmission-setting ratio position of the swashplate.

16. The transmission defined in claim 15, wherein the valve sleeve includes a vent opening to which the second port is placed into fluid communication by the valve spool when axially positioned by the actuator to produce pivotal motion of the swashplate in the first transmission ratio-changing direction.

* * * * *